(12) United States Patent
Grall

(10) Patent No.: US 10,513,055 B2
(45) Date of Patent: Dec. 24, 2019

(54) MASTER MODEL HAVING A COMPLEX SHAPE, AND KIT FOR PRODUCING SAME

(71) Applicant: IXBLUE, Saint-Germain-en-Laye (FR)

(72) Inventor: Sebastien Grall, Aubagne (FR)

(73) Assignee: IXBLUE, Saint-Germain-en-Laye (FR)

( * ) Notice: Subject to any disclaimer, the term of this patent is extended or adjusted under 35 U.S.C. 154(b) by 299 days.

(21) Appl. No.: 15/504,420

(22) PCT Filed: Aug. 19, 2015

(86) PCT No.: PCT/FR2015/052228
§ 371 (c)(1),
(2) Date: Feb. 16, 2017

(87) PCT Pub. No.: WO2016/027035
PCT Pub. Date: Feb. 25, 2016

(65) Prior Publication Data
US 2017/0239849 A1    Aug. 24, 2017

(30) Foreign Application Priority Data
Aug. 21, 2014  (FR) ..................... 14 57918

(51) Int. Cl.
*B29C 33/30* (2006.01)
*B29L 31/30* (2006.01)

(52) U.S. Cl.
CPC .......... *B29C 33/302* (2013.01); *B29C 33/303* (2013.01); *B29C 33/307* (2013.01); *B29L 2031/307* (2013.01)

(58) Field of Classification Search
CPC ..... B29C 33/30; B29C 33/301; B29C 33/302; B29C 33/303; B29C 33/307;
(Continued)

(56) References Cited

U.S. PATENT DOCUMENTS 1,837,078 A * 12/1931 Smith ................ B63B 3/14
                                                    114/79 W
6,759,002 B1    7/2004 Engwall et al.
(Continued)

FOREIGN PATENT DOCUMENTS

| FR | 2 598 648 A1 | 11/1987 |
| WO | 2013/102463 A1 | 7/2013 |
| WO | 2013/120583 A1 | 8/2013 |

OTHER PUBLICATIONS

F.C. Campbell, "Cure tooling: you can pay me now . . . or pay me later", Elsevier, XP055174159, ISBN: 978-1-85-617415-2, pp. 103-130.
(Continued)

*Primary Examiner* — Anthony Calandra
*Assistant Examiner* — Jamel M Nelson
(74) *Attorney, Agent, or Firm* — Young & Thompson

(57) ABSTRACT

Disclosed is a master model (1) defining a useful surface having a complex shape, including a set of juxtaposed frames (2a, 2b, 2c), each frame including a panel having a useful edge (8), the frames being disposed parallel and held rigidly connected with predefined spacings such that the useful edges of same form the useful surface. The panel of each frame includes a blind slot (10) forming an opening passing through the thickness, and the frames are rigidly connected by a spar (3, 3a, 3b, etc.) suitable for being inserted (6) in the lengthwise direction (L) of same into the slots and including transverse notches (11) for receiving and holding the frames, each notch being arranged to receive, by a relative transverse translational movement (7) of the spar relative to the frames, the part in question of the panel of each frame.

20 Claims, 3 Drawing Sheets

Figure 3:
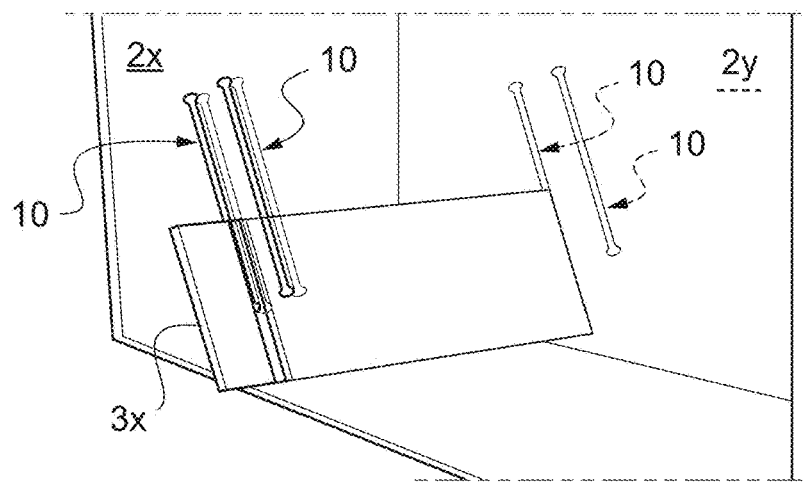

(58) Field of Classification Search
CPC ....... B29L 2031/307; B63B 3/00; B63B 5/00; B63B 2241/00; B63B 2241/02; B63B 2241/20; B63B 2701/00
See application file for complete search history.

(56) References Cited

U.S. PATENT DOCUMENTS

2005/0006823 A1* 1/2005 Merrick ................ B29C 70/443
264/511
2014/0345789 A1* 11/2014 Eichler .................. F03D 1/065
156/212

OTHER PUBLICATIONS

International Search Report, dated Nov. 17, 2015, from corresponding PCT application.

* cited by examiner

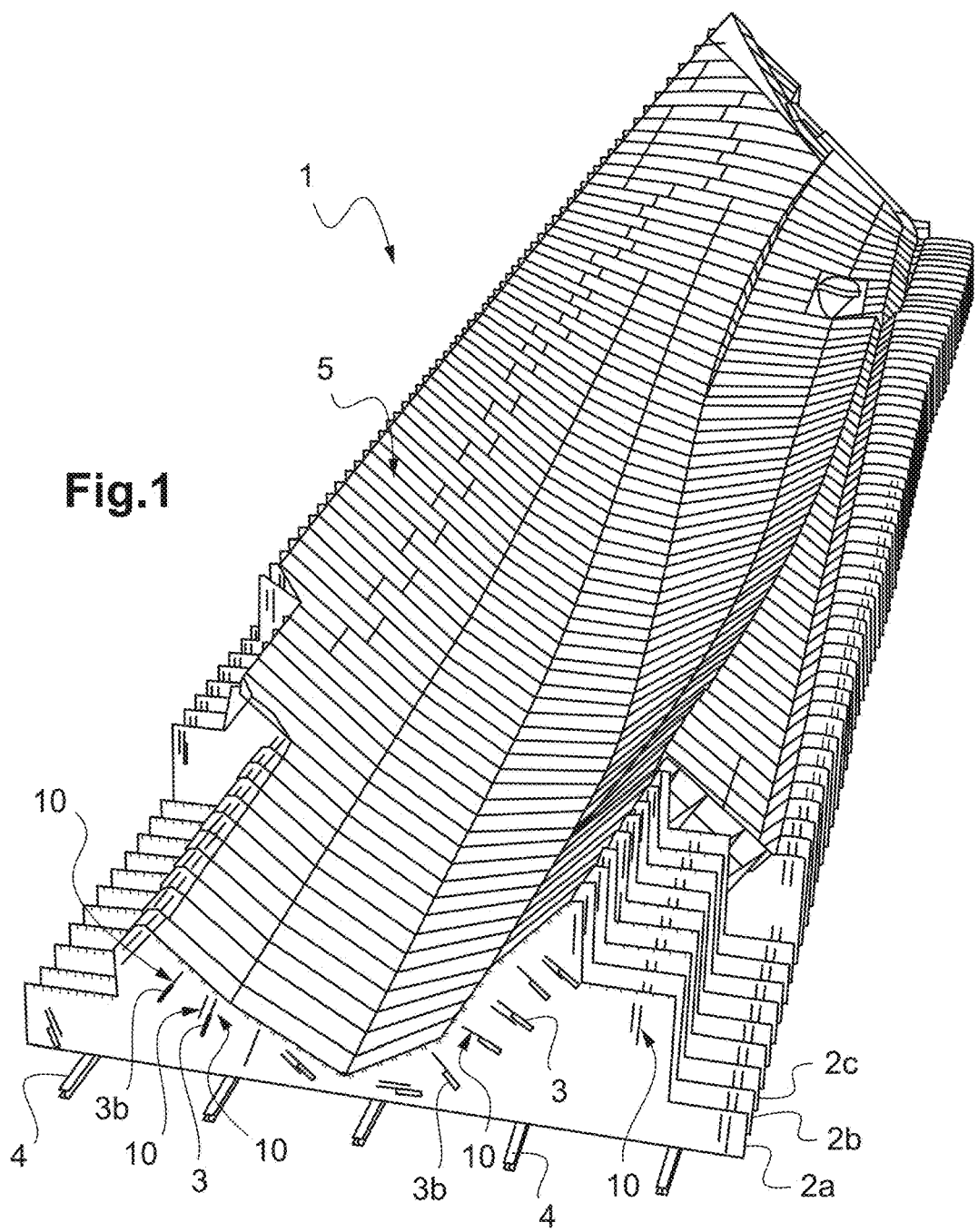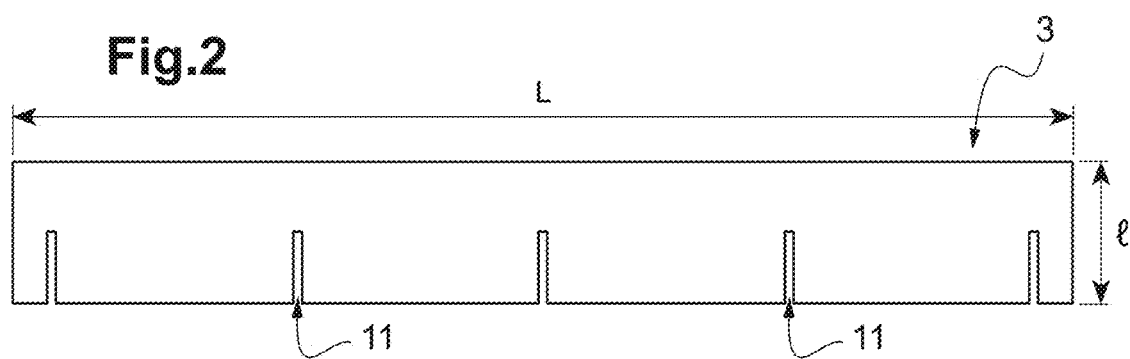

MASTER MODEL HAVING A COMPLEX SHAPE, AND KIT FOR PRODUCING SAME

The present invention has for object a master model of complex shape, for example for the moulding of a ship or boat shell. A kit comes and completes the invention.

The master models are intended to form surfaces of complex shape on which it will be possible to make an object whose external surface will take this complex shape. They are used in the field of construction of ship shells and are generally manufactured for limited series, then destroyed. Moreover, their mode of manufacturing results in that they are not easy to displace if their size is considerable due to the fact that they are generally single-piece or non-dismountable.

Several modes of implementation of master models are known, having slots for receiving spars in transverse frames, as described in the following documents: "Cure tooling: you can pay me now . . . or pay me later" de F. C. Campbell, Elsevier, XP055174159, ISBN: 978-1-85-617415-2, pages 103-130, or WO 2013/120583 A1, FR 2 598 648 A1 and U.S. Pat. No. 6,759,002 B1.

Herein, a master model is proposed, which is consisted of elements able to be easily assembled to form a rigid and strong structure and able to be as easily disassembled to be displaced or stored before a potential subsequent reassembly. Moreover, at least a part of the elements constituting the master model may be reused for the making of a new master model of different shape, in particular at least the spars as will be seen.

The invention hence relates to a master model defining a useful surface of complex shape, in particular for the moulding of boat or ship shells, including: a set of juxtaposed frames, each frame including a panel having at least one useful edge arranged to form a corresponding section of said useful surface, the frames being arranged parallel to each other and held rigidly connected to each other with predetermined spacings and such that their useful edges form the desired useful surface.

According to the invention, the panel of each frame includes at least one slot forming a blind aperture through the thickness, and the frames are rigidly connected to each other by at least one spar that is adapted to be inserted along its length direction through the slots of the frames and that includes transverse notches for receiving and holding the frames, each notch being arranged to receive, after the spar has been inserted and under the effect of a relative transverse translation of the spar with respect to the frames, the concerned part of the panel of each frame.

In various modes of implementation of the invention, the following means, which can be used alone or according to any technically possible combination, are used:
the width of each notch is substantially equal to the thickness of the corresponding frame at least in the concerned zone of the frame so that the clearance is minimum between the concerned frame and the spar,
the spar is a lengthwise-extending flat element,
the spar is a lengthwise-extending straight flat element,
the spar is a lengthwise-extending curved flat element,
the spar has two opposite lengthwise edges and includes transverse notches only along one of these two lengthwise edges,
the spar has two opposite lengthwise edges and includes transverse notches along these two lengthwise edges,
the inserted and translated spars are in planes that are parallel to each other,
the inserted and translated spars are in planes that are not parallel to each other,
some of the inserted and translated spars are in planes that are parallel to each other,
the slots are vertical,
the slots are inclined with respect to the vertical,
the slots, except the two slots of one pair, of a given frame are not parallel to each other,
some of the slots, in particular the two slots of one pair, of a given frame are parallel to each other,
each frame includes at least two slots and the frames are assembled by at least two flat-shaped spars, each inserted into an associated slot of each spar, so that the greatest dimension of the transverse section of a spar extends along a direction substantially not parallel to that of another spar,
the shape and thickness of the spar are almost equal to those of the slots into which it is inserted in order that, once the spar inserted then transversally translated for insertion of the frames into the notches, the clearance is minimum between the frames and the spar,
once the frame inserted then transversally translated for insertion of the frames into the notches, a part of the slots into which the spar is installed is then cleared,
the slot is of constant width over its whole height,
the slot has over its height at least two parts of different widths,
the cleared part of the slot is wider than the non-cleared part,
in the frames, at least some of the slots are made by pairs, the two slots of one pair being parallel and close to each other,
the two slots of one pair of slots are arranged substantially at the same height through a frame,
the frames are arranged on a support, the support including means for positioning and holding the frames before placement of the spar,
said at least one spar is formed of a series of unitary spars each having a unitary length lower than the length of the master model and arranged in series, transversally offset, over said length of the master model and with overlappings of their adjacent ends through at least two adjacent frames,
unitary spars are extended between only two adjacent frames,
unitary spars are extended between at least three adjacent frames,
unitary spars are extended between at least four adjacent frames,
unitary spars are extended between at least five adjacent frames,
a locking blade is introduced into a cleared part of at least one of the slots to form a wedging, the width of said locking blade being substantially equal to the length/height of the cleared part of the slot once the spar transversally translated in order to lock the translated spar in the slot,
the locking blade has a length substantially equal to that of the corresponding spar,
the frames and the spars are made from plates of any panel material that is easily machinable and rigid,
the frames and the spars are made from rigid metal plates,
the frames and the spars are made from wood or wood-derivative plates.

The invention also relates to a kit for making a master model including at least frames provided with slots and spars provided with notches, allowing the making of the master model of the invention by insertion of the spars into the slots then translation of the spar notches on the frames.

Figure 4:
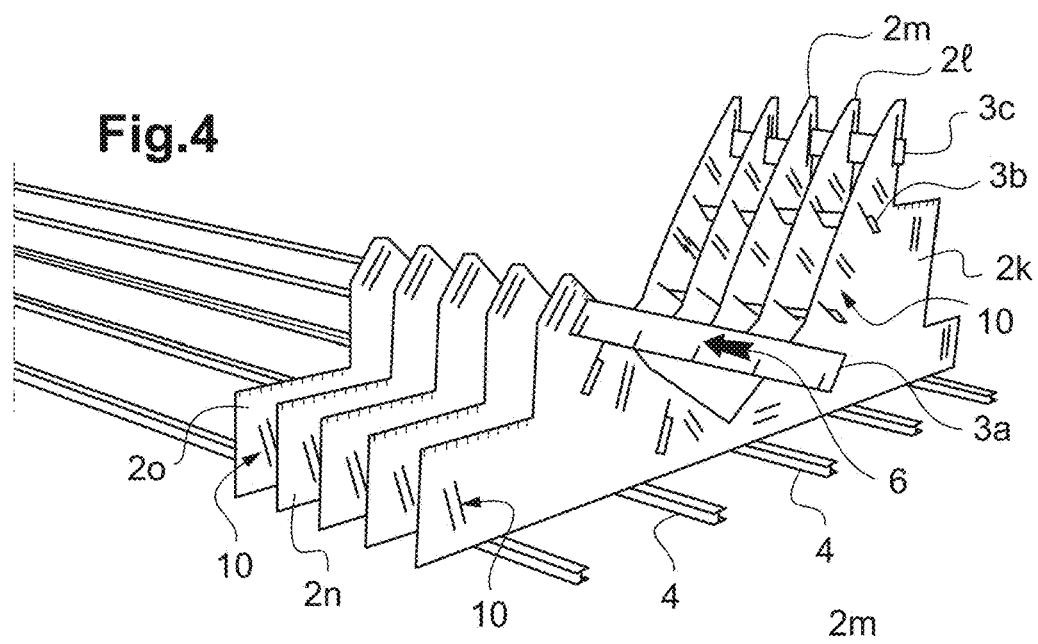
Figure 5:
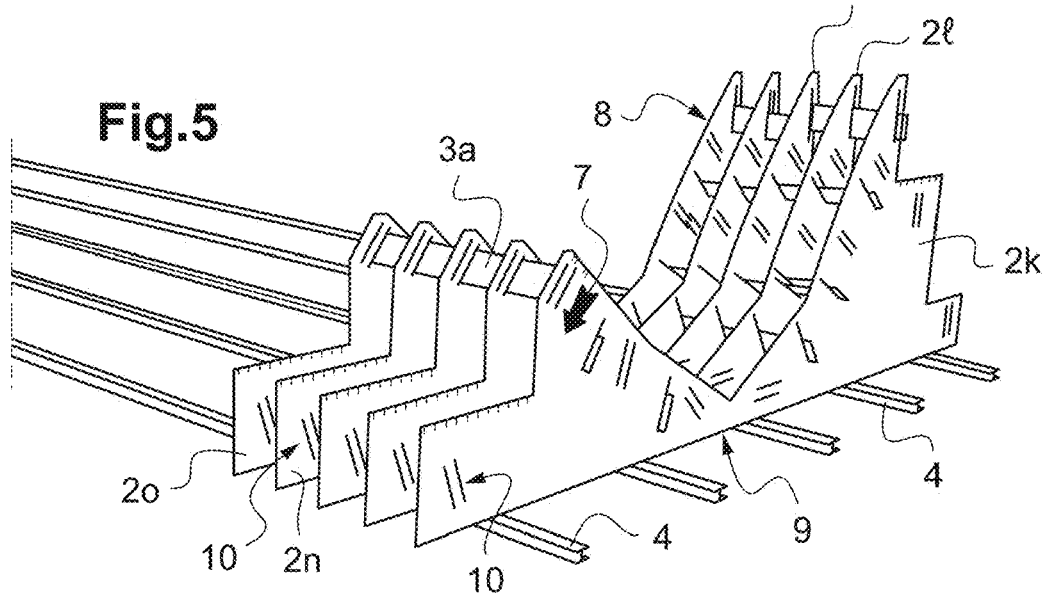
Figure 6:
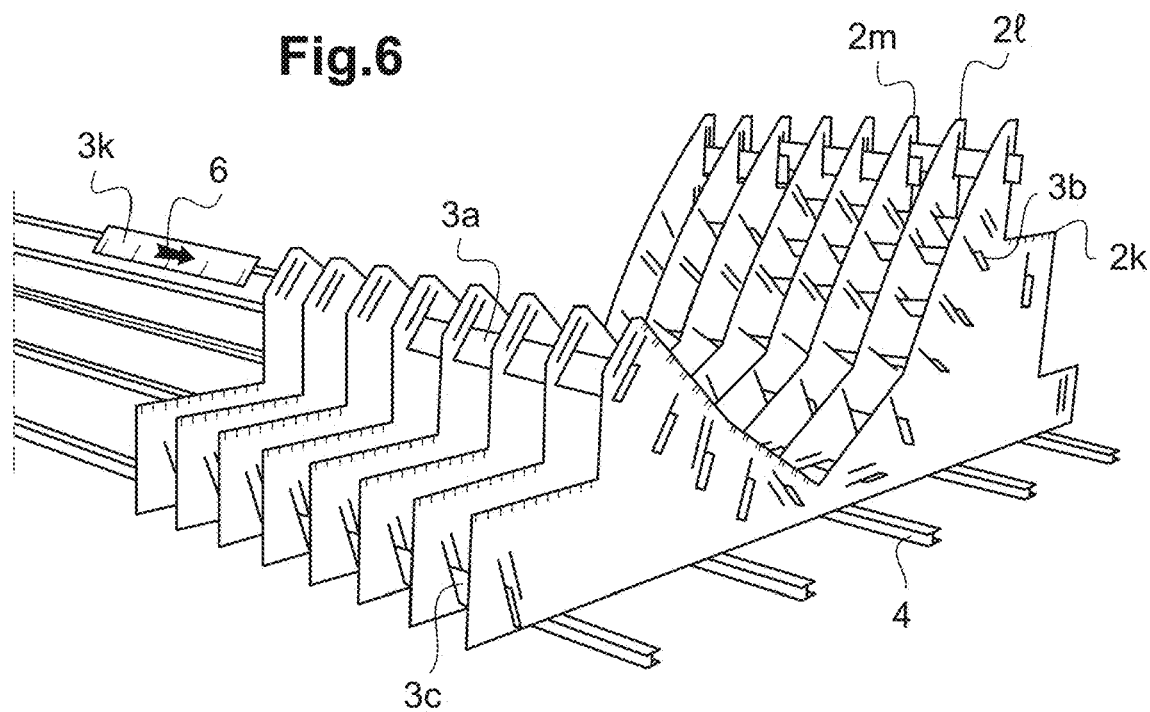
Figure 7:
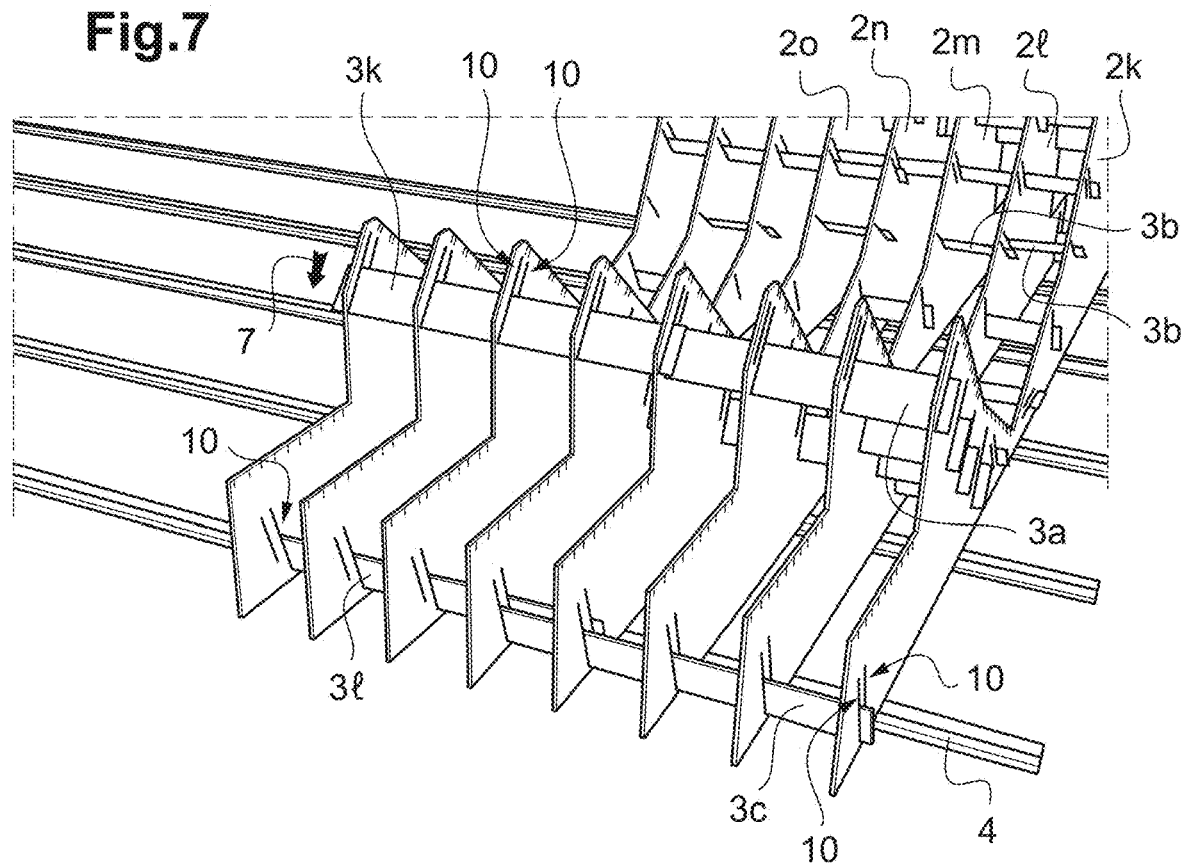

The present invention will now be exemplified, without being limited thereby, by the following description of embodiments and modes of implementation in relation with:

FIG. 1, which shows a top and perspective view of a master model,

FIG. 2, which shows a side view of a spar provided with transverse notches,

FIG. 3, which shows a partial view of a master model showing the relations between two frames provided with a pair of slots and a spar, FIG. 4, which shows a perspective view of a master model in course of construction, showing the installation of a spar through frames in a first phase in which the spar is inserted along its length direction through slots of the frames, FIG. 5, which shows a perspective view of a master model in course of construction, showing the installation of a spar through frames in a second phase in which the spar is transversally translated, FIG. 6, which shows a perspective view of a master model in course of construction, showing the installation of two spars through an aligned series of pairs of slots and with overlapping of the ends of the two spars, the second spars having to be inserted, and FIG. 7, which shows a perspective view of a master model in course of construction, showing the result of the installation of two spars through an aligned series of pairs of slots and with overlapping of the ends of the two spars.

As seen, the invention allows making a mould or master model 1 having a moulding surface of complex shape, in particular for the moulding of surface or underwater boat or ship shells, by implementing a set of frames. An example of such a mould or master model is given in FIG. 1. The length of such a master model may be of a few metres to several tens of metres, with a width of several metres, and with frames spaced from each other by 50 cm to a few metres.

Each frame 2a, 2b, 2c . . . is an extended, solid, planar panel, including at least a lower edge 9 and one upper edge 8. The upper edge 8 of the frame is intended to make the complex shape of the master model and it is hence cut according to a section of the useful surface of the master model. To make the master model, the frames 2a, 2b, 2c . . . are placed vertically on a support, by their lower edges 9, parallel to each other, and they are held together by at least spars 3 provided with notches 11. Surface elements 5 are finally installed between the upper edges 8 of the frames 2a, 2b, 2c . . . in order to form the complex surface of the mould or master model 1.

The frames are installed on a support that includes proper means for positioning and holding the frames. The positioning and holding means of the support are, for example, notches, i.e. of the lower edge of the frames, or of the support, or both, and in the latter case said notches are preferably complementary to each other to fit into each other by pairs. The positioning and holding means of the support may also include jaw-clamping means able to clamp the frames, said clamping means being preferably adjustable in position. In the figures, in order to simplify them, the supports are schematized by beams 4.

Generally, the frames 2a, 2b, 2c . . . are arranged transversally with respect to the length of the master model 1. These frames are preferably panels that have a good rigidity and that are easily machinable. If the panels are preferably made of wood or wood-based, in variants, they may be made in part or in totality of metal. It may be the same for the spars.

The frames 2a, 2b, 2c . . . includes elongated straight/linear slots 10 of determined length and width and that form alignments between the successive adjacent frames over the length of the master model or a part of this length, alignments of slots 10 into which are inserted the spars 3, 3a, 3b . . . in the shape of elongated plates. The slots 10 of the frames are formed in the plain face and hence do not open on an edge 8, 9 of a frame 2a, 2b, 2c . . . .

In practice, given the length of the master model 1, these alignments of slots 10 are made on a sub-set of the slots and hence of corresponding successive adjacent frames 2a, 2b, 2c . . . . Hence, the slots 10 are grouped by sub-sets of slots of adjacent frames in the master model, one sub-set of slots of adjacent frames having its slots aligned along a plane of slots 10 perpendicular to the frames 2a, 2b, 2c . . . so as to be able to introduce into said slots of the sub-set, passing through the corresponding frames, the spar 3 that is of determined length and width (=height).

In the case of a master model 1 of relatively reduced length, spars 3 having the length of the master model may be implemented and hence all the frames are passed through by the spars. Therefore, the spars may be of the same length as the master model or of lower length than the master model and in this last case they may, if desired, be called "unitary spars". Preferably, in the case where the spars have lengths lower than that of the master model, the spars are arranged in series and so that there is an overlapping of the close/adjacent spars at the corresponding ends of the spars 3 on at least two adjacent frames.

The length, herein height, of the slots 10 is higher than or almost equal to the width or height l of the spar 3 and, preferably, the thickness of the spar is almost equal to the width of the slot in order to allow both inserting the spar into the slots through the frames and obtaining a minimum clearance between the frames and the spar 3 at least at the slots 10. In a variant, the width of the slots 10 is higher than the thickness of the spar in order to facilitate the action of insertion of the spar 3 through the frames 2a, 2b, 2c . . . . If, preferably, the slots 10 have rectangular openings through the frames 2a, 2b, 2c . . . , in variants, they may have truncated triangular shapes.

The elongated spar 3 includes, along one of its two edges of length L, notches 11 perpendicular to said edge. These notches are made so that, once the spar introduced and inserted along its length direction through the sub-set of slots of adjacent frames, the spar 3 can slide/be translated transversally along its width/height direction along the slots in order to release a part of said slots of the sub-set and hence to allow the holding of the frames. During this sliding/translation schematized by the thickened arrow 7 in FIG. 5, the spar moves along a direction carried by planes parallel to the frames and, hence, perpendicularly to the direction that the spar 3 had follows at the time of its previous introduction by insertion through the different slots 10 and that is schematized by the thickened arrow 6 in FIG. 4. The placement and rigid connection of the frames are continued as shown in FIGS. 6 and 7 with insertion 6 of the spar 3k then translation 7 of said spar 3k. It is understood that the dismounting of the master frame will be performed by the reverse operations: first, reverse translation then counter-insertion or continuation of the insertion according to the side of the frames from which it is desired to remove the spar, respectively on the side where the insertion had been started or on the opposite side. The spars, which have notches, are similar to combs and are hence introduced into the slots of the frames.

The width of the notch 11 is substantially equal to the thickness of the frame in its corresponding sliding/translation part in order that, once the spar inserted then translated, the clearance is minimum between the frames and the spar, at least at the notches.

In order to improve the stability of the assembly, each panel of the frames may include guides, on the one hand, along the two lengthwise edges of the considered slot, and/or on the other hand, in continuity of the slot in the panel of the frame along the two axes of these two slot lengthwise edges. It is understood that, in the latter case, the guides are on the side of the slot end towards which the transversal translation of the spar is performed. These guides may be on a single side/face of the frame or on both sides/faces. These guides are for example made from an "L-shaped" angle bar, hence with two wings perpendicular to each other. The surface of the spar will bear on one of the two wings, the other wing being fixed/rigidly connected to the surface of the frame panel. In a variant, the guides are present only along the edges of the slot and result from a deformation of the metal by a spinning having led to the opening of the slot.

Preferably, the notches 11 are made along a single one of the two edges of length L of the spar 3. But, in a variant, notched spars may made, including notches along the two lengthwise edges of the spar, the spacings between the notches being identical, possibly offset, between the two edges in order to be able to user the spar on one side or on the other, and/or to translate it on one side or on the other of the slots. In a variant of the latter case, the spacings between the notches are different between the two lengthwise edges of the spar in order to be able to use a same notched spar for two different arrangements of the corresponding frames by returning the spar. If, preferably, the spar 3 provided with notches 11 includes a number of notches equal to the number of frames it supports over its length, in a variant, the notched spar includes a number of notches higher than the number of frames it supports over its length L.

The frames 2a, 2b, 2c . . . being panels of a relatively high width, generally several meters, it is preferable to distribute several spars over the width of the frames. Hence, a given frame includes at least two slots 10, each of the slots of said frame belonging to a distinct sub-set of slots of adjacent frames, sub-set for which a spar is provided. It results from this structure that, in the case of more than one slot per frame, each slot of the frame belongs to a distinct sub-set of slots of adjacent frames receiving its own spar. Preferably, in a given frame, the slots are distributed substantially regularly over the surface of the frame and over the width of the frame. For example, it may be provided one slot towards each (lateral) width end of the frame and one or several other slots between the two lateral ends.

Still in order to improve the stability of the assembly, it is made so that the slots of a given frame are in slot planes not parallel to each other and hence that the planes carried by the inserted and translated spars are not parallel to each other, and, preferably, these planes have the same direction that corresponds to the length of the master model and they are hence perpendicular to the frames.

Up to now, as shown in the figures, and in order to facilitate the explanations, a master model structure has been considered, whose frames are vertical and perpendicular to the length of the master model and spars parallel to this master model length and hence perpendicular to the frames. It is understood that, in the case where the master model is made with frames that are parallel to each other but that are no longer vertical but inclined, the notches are then no longer perpendicular to the lengthwise edge of the spar but inclined as the frames. Other arrangements of frames between each other are possible and, for example, not parallel to each other, for example radial in the case where the master model must form a curved elongated element, and in such cases, the orientations of the notches and the spacings between notches will be adapted. Curved spars may even be provided in the case of a radial or star arrangement of the frames. The plane of alignment of the slots of a sub-set of slots may be non-perpendicular to the frames. In other variants, the spar, instead of being planar, may be bypassed.

In the embodiment represented, each slot is made by pairs and the two slots of one pair are parallel and close to each other. This arrangement by pairs of slots 10 is better seen in FIG. 3, where the foreground frame 2x has been made transparent and the background frame 2y can be seen (underlined by dotted lines to mean that it is seen in transparency). The two slots 10 of the background frame 2y (pointed out by dotted-lines arrows to mean that they are seen in transparency) are aligned with those of the foreground frame 2x. A spar 3x has been inserted into then translated in one of the two slots of each pair and through the two frames 2x, 2y, the two concerned slots being aligned so that the spar, which is here a straight plate, can pass through.

This embodiment of slots by pairs is particularly interesting in the case where the spars have a length lower than that of the master model and where they must be placed in series with overlapping of their corresponding ends through at least one, preferably two (or even more) adjacent frames. Indeed, this overlapping requires a lateral offset from a first frame to the following one along the placement in series because a given slot can receive only one spar. Hence, the first spar ends up in the first slot of the pair of slots and the following spar begins, to within the overlapping between two frames, in the second slot of said pair of slots with a reduced lateral offset from one spar to the following one and while remaining in planes parallel to each other, the two slots of the pair being close and parallel to each other. Such an overlapping can be seen at the foreground in FIG. 7, where the two frames 2n and 2o receive the ends of two frames 3c and 3l in two close parallel slots 10 of a pair of slots. It is the same in the middle ground, where the two frames 2n and 2o receive the ends of two spars 3a and 3k in two close parallel slots 10 of a pair of slots. On the background, short spars 3b extended between only two adjacent frames are implemented.

In a variant, instead of pairs of slots, specific overlapping slots are made, of greater width, almost twice the thickness of a spar, and into which two spar ends may be inserted and translate, and it is then understood that the successive alignments of sub-sets of slots must be offset from each other by one spar thickness.

In order to lock the structure, a locking blade is provided, which is introduced into the cleared part of at least one of the slots having received a spar, the width of the locking blade being substantially equal to the length of the cleared part of the slot following the translation of the spar in order to lock the inserted and translated spar in the slot. This locking blade may be of triangular shape to form a corner that will be more easy to insert into the slot. It may be provided one locking blade per slot or less, or more, a locking blade that has a length substantially equal to that of the corresponding spar. Hence, the locking blade forms a wedging.

In other variants of embodiment, secondary notched spars are further implemented, and these secondary spars are inserted along their length direction into the slots after that the initial spars have been inserted and translated. It is understood that the width or height of the secondary spar must be lower than or equal to the length of the cleared part of the slot following the translation of the initial spar. Likewise, the notches of the secondary spar must be oriented opposite to the direction of the notches of the initial spar because said notches of the secondary spar are intended to come opposite corresponding frames on the side opposite to the initial spar of the slot. The secondary spar is also translated along its width direction along the slot but in a direction opposite to the translation performed by the initial spar. In order to lock the whole, a locking blade is then introduced in at least one of the slots between the initial spar and the secondary spar in order to lock these two spars slid towards the two opposite sides of the slot.

The frames 2a, 2b, 2c . . . , apart from the specific shape of their upper edges 8, are relatively simple to manufacture as regards the slots 10 because they are identical/stackable for a certain number of frames, or even all the frames, in particular when the slots are made by pairs.

Of course, the present invention is not limited to the particular embodiments that have just been described, but extends to any variant and equivalent in accordance with the scope thereof. Hence, it is well understood that the invention may be adapted according to many other possibilities without thereby departing from the scope defined by the description and the claims. For example, if it has been considered that the frames and the notched spars are made from planar plates as well as the possible locking blades, it is contemplated to implement other shapes or materials. Hence, the spars may be T-shaped or L-shaped profiles and, in this case, the width and/or the shape of the slot will be adapted accordingly. Likewise, removable fixation means may be provided between the frames and the spars, for example as pins, rods or screws/bolts. If, preferably, the master model is able to be dismounted and to be reassembled, it is possible, as a variant, to implement definitive fixation means between the frames and the spars, said definitive fixation means being typically adhesive, welding or brazing means. Finally, the master frame 1 that allows making mouldings of great-size parts is not limited to the maritime applications but can be applied to other fields as, for example, the moulding of an aircraft wing in aeronautics.

The invention claimed is:

1. A master model defining a useful surface of complex shape, said model comprising:
a set of juxtaposed frames, each frame comprising a panel comprising at least one useful edge arranged to form a corresponding section of said useful surface, the frames being arranged parallel to each other and held rigidly connected to each other with predetermined spacings and such that their useful edges form the desired useful surface,
wherein the panel of each frame comprises at least one slot forming a blind aperture through a thickness of the panel, and
wherein the frames are rigidly connected to each other by at least one spar that is adapted to be inserted along its length direction through the slots of the frames, said spar comprising transverse notches for receiving and holding the frames, each notch being arranged to receive, after the spar has been inserted and under the effect of a relative transverse translation of the spar with respect to the frames, a corresponding part of the panel of each frame,
the transversely translated spar defining a cleared part in the slot that forms the blind aperture.

2. A master model according to claim 1, wherein a width of each notch is substantially equal to the thickness of the corresponding frame at least in the corresponding zone of the frame so that the clearance is minimum between the corresponding frame and the spar.

3. A master model according to claim 2, wherein a shape and a thickness of the spar are almost equal to those of the slots into which the spar is inserted in order that, once the spar inserted then transversally translated for insertion of the frames into the notches, the clearance is minimum between the frames and the spar.

4. A master model according to claim 1, wherein the spar has two opposite edges of an equal length and includes transverse notches only along one of these two lengthwise edges.

5. A master model according to claim 1, wherein each frame includes at least two slots and wherein the frames are assembled by at least two flat-shaped spars, each inserted into an associated slot of each spar, so that the greatest dimension of the transverse section of a spar extends along a direction substantially not parallel to that of another spar.

6. A master model according to claim 1, wherein, in the frames, at least some of the slots are made by pairs, the two slots of a pair being parallel and close to each other.

7. A master model according to claim 1, wherein the frames are arranged on a support, the support being configured to position and hold the frames before placement of the spar.

8. A master model according to claim 1, wherein said at least one spar is formed of a series of unitary spars each having a unitary length shorter than the length of the master model and arranged in series, transversally offset, over said length of the master model and with overlappings of their adjacent ends through at least two adjacent frames.

9. A master model according to claim 1, wherein a locking blade is introduced into the cleared part of at least one of the slots to form a wedging, the width of said locking blade being substantially equal to the length of the cleared part of the slot once the spar transversally translated in order to lock the translated spar in the slot.

10. A master model according to claim 9, wherein the locking blade has a length substantially equal to that of the corresponding spar.

11. Kit for making a master model comprising at least frames provided with slots and spars provided with notches, allowing the making of the master model according to claim 1 by insertion of the spars into the slots then translation of the spar notches on the frames.

12. Kit for making a master model comprising at least frames provided with slots and spars provided with notches, allowing the making of the master model according to claim 2 by insertion of the spars into the slots then translation of the spar notches on the frames.

13. Kit for making a master model comprising at least frames provided with slots and spars provided with notches, allowing the making of the master model according to claim 3 by insertion of the spars into the slots then translation of the spar notches on the frames.

14. Kit for making a master model comprising at least frames provided with slots and spars provided with notches, allowing the making of the master model according to claim 4 by insertion of the spars into the slots then translation of the spar notches on the frames.

15. Kit for making a master model comprising at least frames provided with slots and spars provided with notches, allowing the making of the master model according to claim

5 by insertion of the spars into the slots then translation of the spar notches on the frames.

16. Kit for making a master model comprising at least frames provided with slots and spars provided with notches, allowing the making of the master model according to claim 6 by insertion of the spars into the slots then translation of the spar notches on the frames.

17. Kit for making a master model comprising at least frames provided with slots and spars provided with notches, allowing the making of the master model according to claim 7 by insertion of the spars into the slots then translation of the spar notches on the frames.

18. Kit for making a master model comprising at least frames provided with slots and spars provided with notches, allowing the making of the master model according to claim 8 by insertion of the spars into the slots then translation of the spar notches on the frames.

19. Kit for making a master model comprising at least frames provided with slots and spars provided with notches, allowing the making of the master model according to claim 9 by insertion of the spars into the slots then translation of the spar notches on the frames.

20. Kit for making a master model comprising at least frames provided with slots and spars provided with notches, allowing the making of the master model according to claim 10 by insertion of the spars into the slots then translation of the spar notches on the frames.

* * * * *